US007810109B2

(12) United States Patent
Haas et al.

(10) Patent No.: US 7,810,109 B2
(45) Date of Patent: Oct. 5, 2010

(54) COMPACT DISC PICKER

(75) Inventors: Darren Haas, Minnetonka, MN (US); Erick Hagstrom, Medina, MN (US)

(73) Assignee: Primera Technology Inc., Plymouth, MN (US)

(*) Notice: Subject to any disclaimer, the term of this patent is extended or adjusted under 35 U.S.C. 154(b) by 1048 days.

(21) Appl. No.: 11/501,409

(22) Filed: Aug. 9, 2006

(65) Prior Publication Data

US 2008/0036843 A1 Feb. 14, 2008

(51) Int. Cl.
*G11B 17/08* (2006.01)

(52) U.S. Cl. .................................................... 720/600

(58) Field of Classification Search .................. 720/600
See application file for complete search history.

(56) References Cited

U.S. PATENT DOCUMENTS

| | | | | |
|---|---|---|---|---|
| 3,976,301 | A | 8/1976 | Corbett et al. | 274/10 D |
| 5,040,159 | A | 8/1991 | Oliver et al. | 369/34 |
| 5,195,794 | A | 3/1993 | Hummel, Jr. et al. | 294/94 |
| 5,291,465 | A | 3/1994 | Dennis | 369/37 |
| 5,542,526 | A * | 8/1996 | Wurgler | 198/803.7 |
| 5,549,444 | A | 8/1996 | Dubuit | 414/796.7 |
| 5,734,629 | A | 3/1998 | Lee et al. | 369/34 |
| 5,803,521 | A | 9/1998 | Zejda et al. | 294/97 |
| 5,873,692 | A | 2/1999 | Costas | 414/796.9 |
| 5,897,153 | A * | 4/1999 | Philipps et al. | 294/93 |
| 5,914,918 | A | 6/1999 | Lee et al. | 369/34 |
| 5,927,208 | A | 7/1999 | Hagstrom et al. | 101/486 |
| 5,934,865 | A * | 8/1999 | Meadows | 414/796.9 |
| 5,946,216 | A | 8/1999 | Hollerich | 364/478.11 |
| 6,111,847 | A | 8/2000 | Assadian | 369/178 |
| 6,141,298 | A | 10/2000 | Miller | 369/30 |
| 6,220,640 | B1 | 4/2001 | Jensen et al. | 294/93 |
| 6,317,406 | B1 | 11/2001 | König et al. | 369/270 |
| 6,321,649 | B1 | 11/2001 | Vangen et al. | 101/35 |
| 6,327,230 | B1 | 12/2001 | Miller et al. | 369/34 |
| 6,400,659 | B1 | 6/2002 | Kitaoka | 369/34 |
| 6,578,257 | B1 * | 6/2003 | Wang | 29/759 |
| 6,760,052 | B2 | 7/2004 | Cummins et al. | 347/171 |
| 6,802,070 | B2 * | 10/2004 | Britz et al. | 720/619 |
| 6,848,113 | B2 | 1/2005 | Klein | 720/619 |
| 7,146,620 | B2 * | 12/2006 | Klein | 720/619 |
| 7,305,684 | B2 * | 12/2007 | Klein | 720/619 |
| 2004/0005213 | A1 | 1/2004 | Hegedus | 414/785 |

FOREIGN PATENT DOCUMENTS

| | | | |
|---|---|---|---|
| EP | 1 120 785 | A1 | 8/2001 |
| GB | 2 230 508 | A | 10/1990 |
| JP | 2002056584 | | 2/2002 |

* cited by examiner

*Primary Examiner*—Mark Blouin
(74) *Attorney, Agent, or Firm*—Westman, Champlin & Kelly, P.A.

(57) ABSTRACT

A picker for compact discs is provided on a picker head and includes a finger which pivots relative to the picker head and will move from a retracted position within a guide that enters the opening in a compact disc to an outward extended position. When the finger is pivoted outwardly, a lug on the finger will engage the edge surface of the opening in the compact disc and urge the disc so the opposite side edge of the opening is urged against portions of the guide to securely grip and hold the disc and permit picking one disc at a time. A sensor is utilized for sensing the position of the disc relative to the guide and to provide a signal to an actuator that operates to cause the finger to move to its outwardly extended position.

17 Claims, 7 Drawing Sheets

COMPACT DISC PICKER

BACKGROUND OF THE INVENTION

An apparatus for picking up a single compact disc, that has a central opening, such as a CD, a DVD and the like is mounted on a manipulator arm that can be moved between various locations. The picker head includes an operating element that is moved to enter the hole in the center of a disc, and upon actuation a finger, grip the edge defining the hole for lifting the disc and transporting it.

Pickers for CDs that will pick an individual disc from a stack of discs and permit handling of that individual disc for movement between a storage location and a processing location have been known. U.S. Pat. No. 5,873,692 illustrates a three finger disc picker. Also, U.S. Pat. No. 6,760,052 shows a picker that is mounted onto an arm that moves transversely across a processor, and up and down so the picker can be moved for entering the center opening in the top disc of a stack of discs and picking the top one from the stack.

The present disclosure thus relates to an improved picker that utilizes a guide for entering an opening in a disc, and a spring loaded finger that normally can be retracted to be within the guide with an actuator, and then when the actuator is released, the finger is spring loaded to engage a surface of the disc opening to provide a pressure loading on the edges of the disc opening against two lugs spaced 130° from the actuated finger for permitting the disc to be lifted.

SUMMARY OF THE INVENTION

A picker head for compact discs provides an arrangement for reliably lifting one disc at a time. The picker head is usually mounted on an arm that can be manipulated and moved to a disc loading station where the picker head will lift a single compact disc from a stack of discs. The picker head then is moved upwardly perpendicular to the plane of the disc in the stack a sufficient distance for clearance, and then it can be moved to a location where, upon releasing the grip of the picker finger used, the disc can be dropped into a desired location. The disc also can be picked up from a processor loading and unloading station and moved to storage.

The picker head is shown with a centering guide and a moveable finger that is spring loaded outwardly from the guide. As the guide moves toward a disc, a sensor provides a signal and the finger is held retracted by an actuator until the guide enters a center opening of a disc to be picked. The drive for moving the guide into the opening lowers the picker head a known distance after the sensor signal is received and then the actuator is released. The finger then moves under the spring load to engage an interior edge of an opening in the compact disc to be picked. The finger will urge the disc it is engaging to move so the side of the center opening opposite from the finger engages lugs above the centering guide and within the disc opening, with a sufficient amount of force so that the disc can then be lifted by the finger and lugs. Once the disc is transported to a desired known location under the programmed controls, the actuator is operated to overcome the spring force on the picker finger so the finger retracts and the disc is released. When no disc is being held, the actuator is released until the disc sensor again indicates the guide is moving toward a disc to be lifted.

The device is easily made, and is simple to operate and control.

DETAILED DESCRIPTION OF ILLUSTRATIVE EMBODIMENTS

Figure 1:
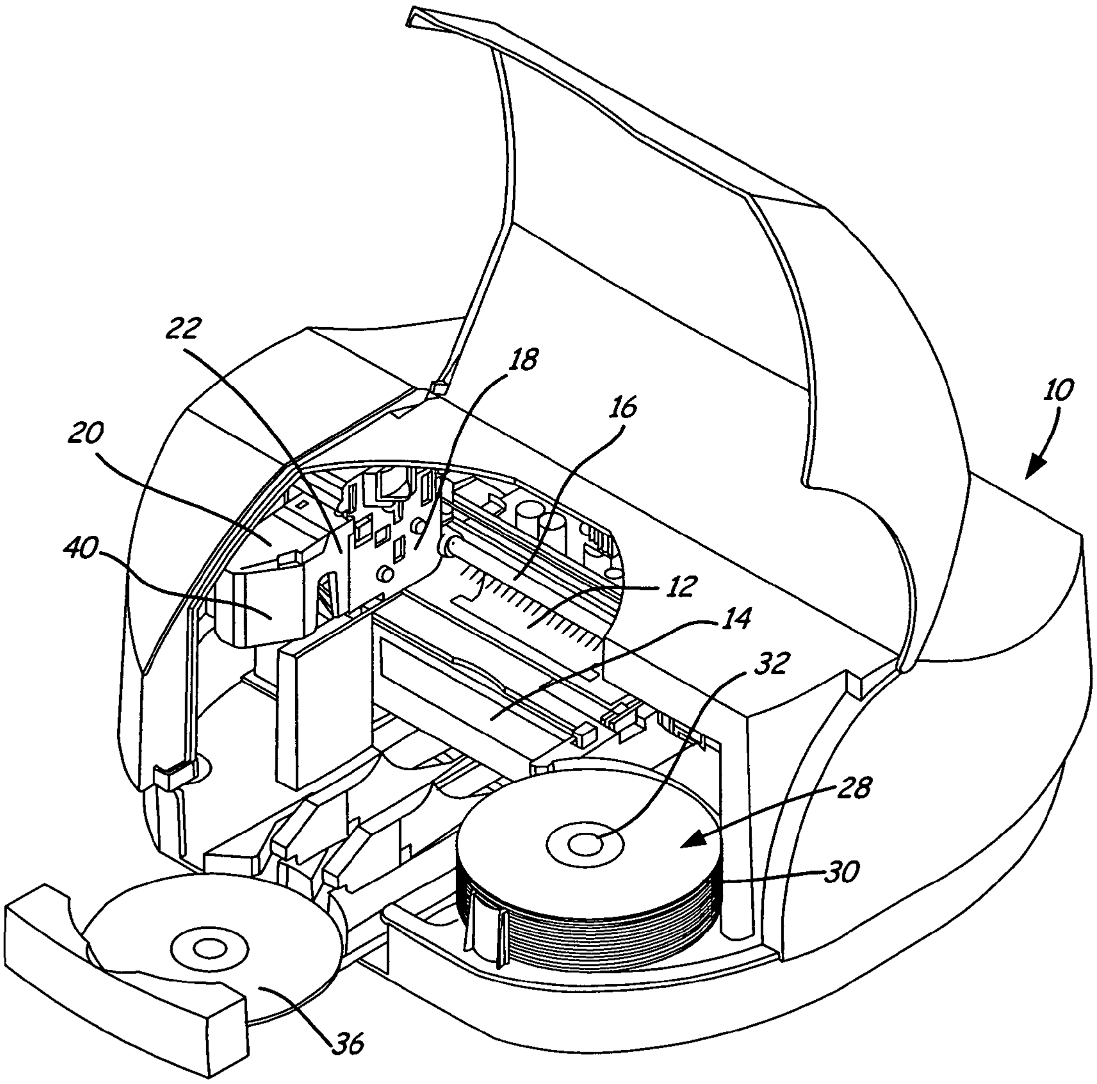
FIG. 1 is a schematic perspective view of a typical processor having a picker head thereon.
Figure 2:
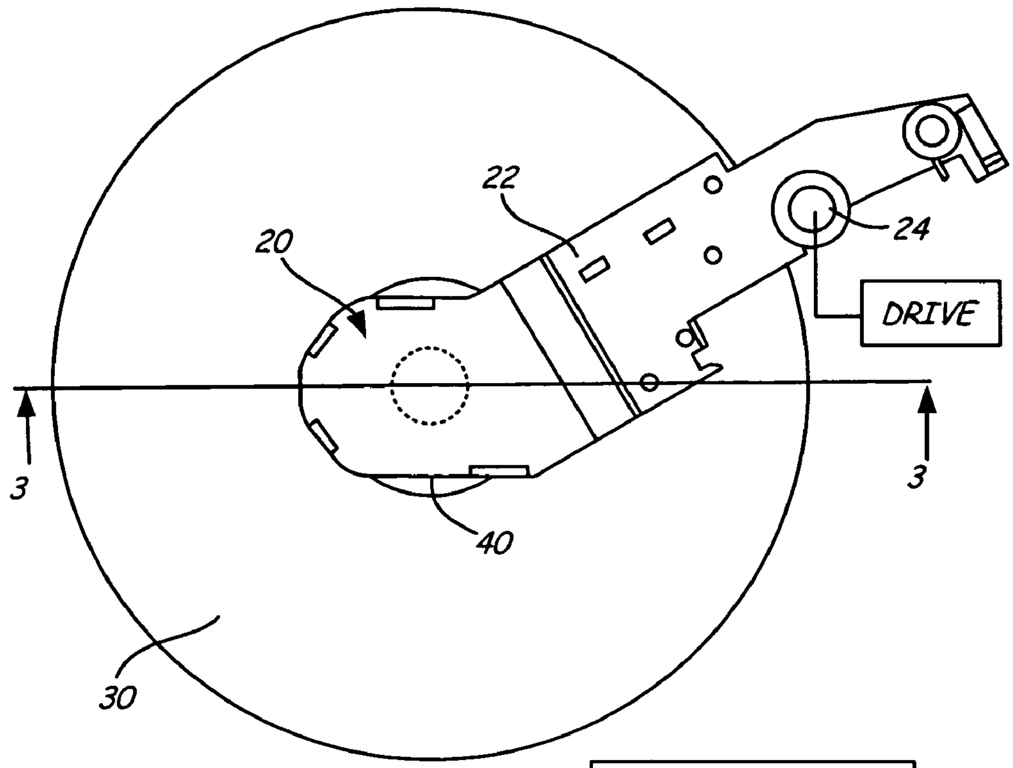
FIG. 2 is a top plan view of the picker head and support arm shown in FIG. 1.

In FIG. 1, a disc processor similar to that shown in U.S. Pat. No. 6,760,052, which is incorporated by reference, shows a processor housing 10 that includes a printer generally shown at 12, and a disc burner or processor 14. The printer has a transverse mounting shaft 16 on which a support 18 for a support arm 22 and a picker head 20 is slidably mounted. A suitable reversible drive including a motor, (not shown) is made to drive the support 18 along shaft 16. The position of the picker head along the shaft 16 is known, and controlled by suitable controls 25. Thus the arm 22 and picker head 20 are movable by the drive in opposite directions along the shaft 16.

Figure 3:
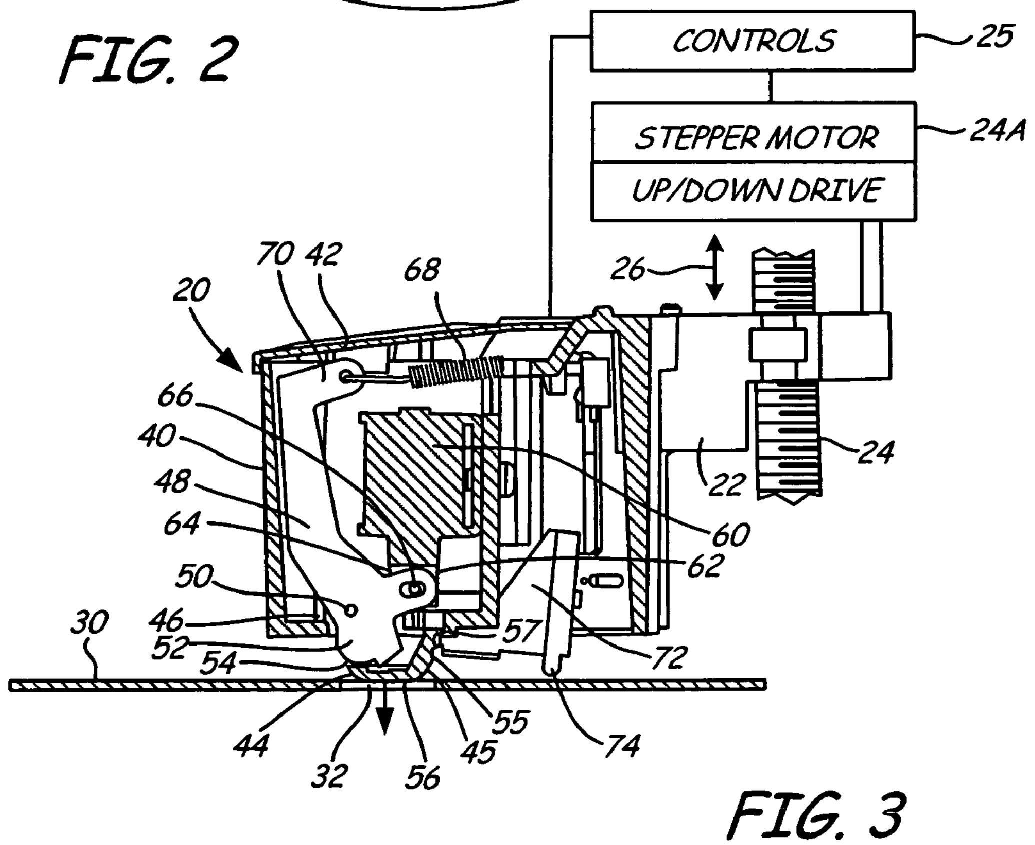
FIG. 3 is a sectional view taken as on line 3-3 in FIG. 2 with the picker in a position with a guide about to enter a center opening of a disc.

The arm 22 is mounted onto support 18 on an up and down drive that can be a threaded shaft or other apparatus 24 driven by a stepper motor 24A or other motor that is position controlled by controls 25 so the vertical position of the picker head is known. The drive 24, 24A will move the arm 22 up and down as indicated by the double arrow 26 (FIG. 3).

Thus, the arm 22 can move laterally from one side of the processor as shown in solid lines in FIG. 1, to a second position which overlies a stack 28 of compact discs 30. The compact discs, DVDs and the like 30 which are media discs, have standard center openings 32, and the surfaces defining the center openings are used for providing a reaction surface for exerting a force to permit removing a top disc from the rest of the discs in the stack. In the showing of FIG. 1, the processor is provided with a slide out drawer 36 that has a storage area 38 for finished or processed discs. Reference is made to co-pending application Ser. No. 11/501,411 filed Aug. 9, 2006, entitled DISC OUTPUT STORAGE DRAWER FOR PROCESSOR, now published as Publication No. US-2008-0036844.

The picker head 20 in the present device has an outer housing 40, which has a removable cover 42, and which is supported on the arm 22 in a suitable manner.

The picker head housing 40 has a lower guide member 44 that is shaped to provide a guide outer surface, such as an axially short conical surface 45. The guide member 44 is of size so that it will at least partially fit within the opening 32 of a compact disc 30. The outer surface 45 of the guide 44 is tapered, and part spherical near the lower end and then conical. The outer surface 45 will cause the guide 44 to center the compact disc to be lifted as the guide moves into the opening 32 of a disc 30 as the arm 22 and the picker head 20 are lowered toward the stack 28 of discs. The guide surface 45 will shift the top disc 30, if needed, for the guide 44 to enter the disc opening. The top disc 30 will seat around a pair of lugs 55 and against a top stop surface 57. The lugs 55 have bottom surfaces 55A that are tapered for guiding the disc into position.

Figure 4:
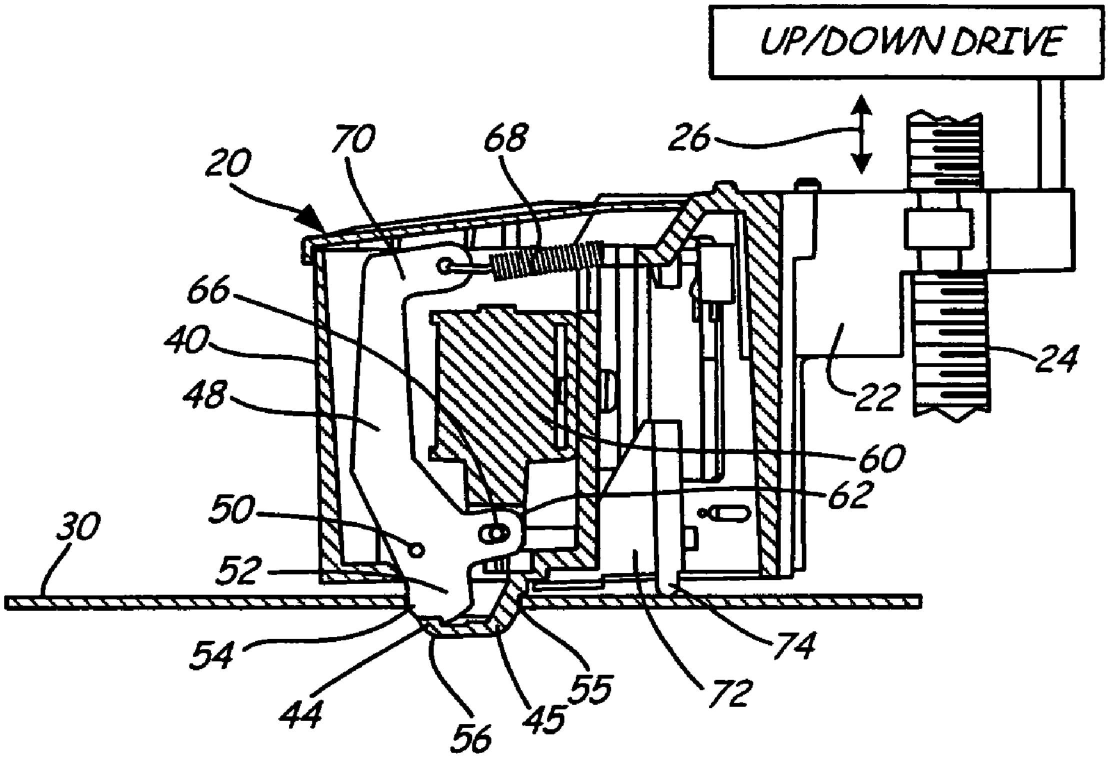
FIG. 4 is a sectional view taken on the same line as FIG. 3 with the picker guide in the disc opening.

The housing 40 further has upright members 46 that mount a picker finger 48 on a pivot pin 50 held on the upright members 46. The finger 48 has a lower end portion 52 that includes a lug or protuberance 54, with a surface that will align with the inner surface defining the opening 32 of the compact disc 30 when the disc is aligned with lugs 55. The lower end 52 of the picker finger including the lug 54 is aligned with a slot 59 (FIG. 5) in the wall of guide 44 so the lug 54 can engage the interior surface of the center opening 32 of the top disc 30. When the finger 48 is pivoted about the pivot pin 50 in a clockwise direction as shown in FIGS. 4 and 6 it will engage the surface of the opening on one side of the disc opening and shift the disc to urge the opposite side of the opening 32 against the lugs 55 of the guide 44. This provides a force that grips the disc sufficient for lifting. The guide 44 has a flat bottom wall 56 and it can be seen in FIG. 6 that it does not extend a substantial distance below the disc 30 that is to be picked when the lugs 55 are in position and the disc engages the stop surface 57.

Figure 5:
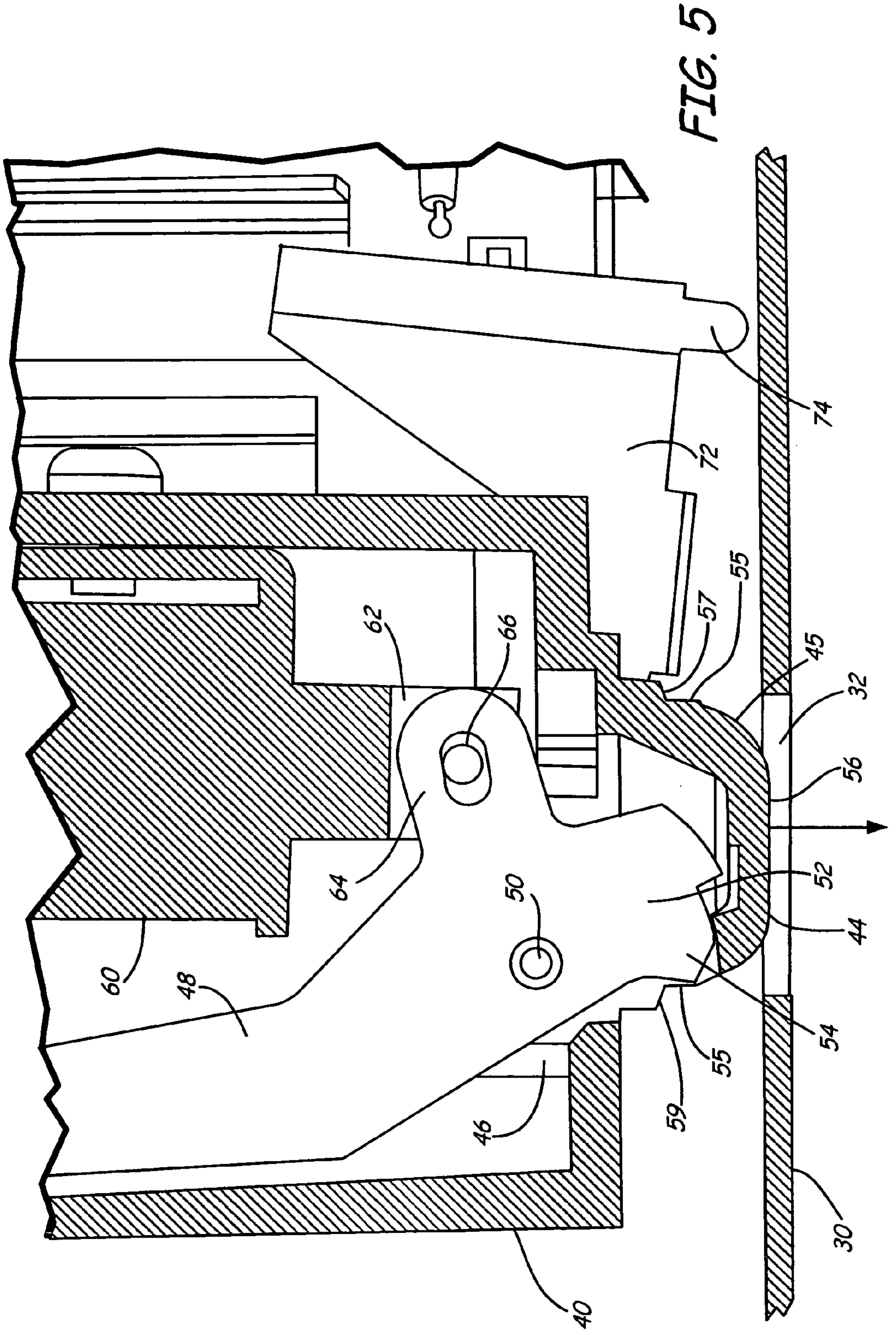
FIG. 5 is an enlarged fragmentary sectional view of the guide in the position of FIG. 3.
Figure 6:
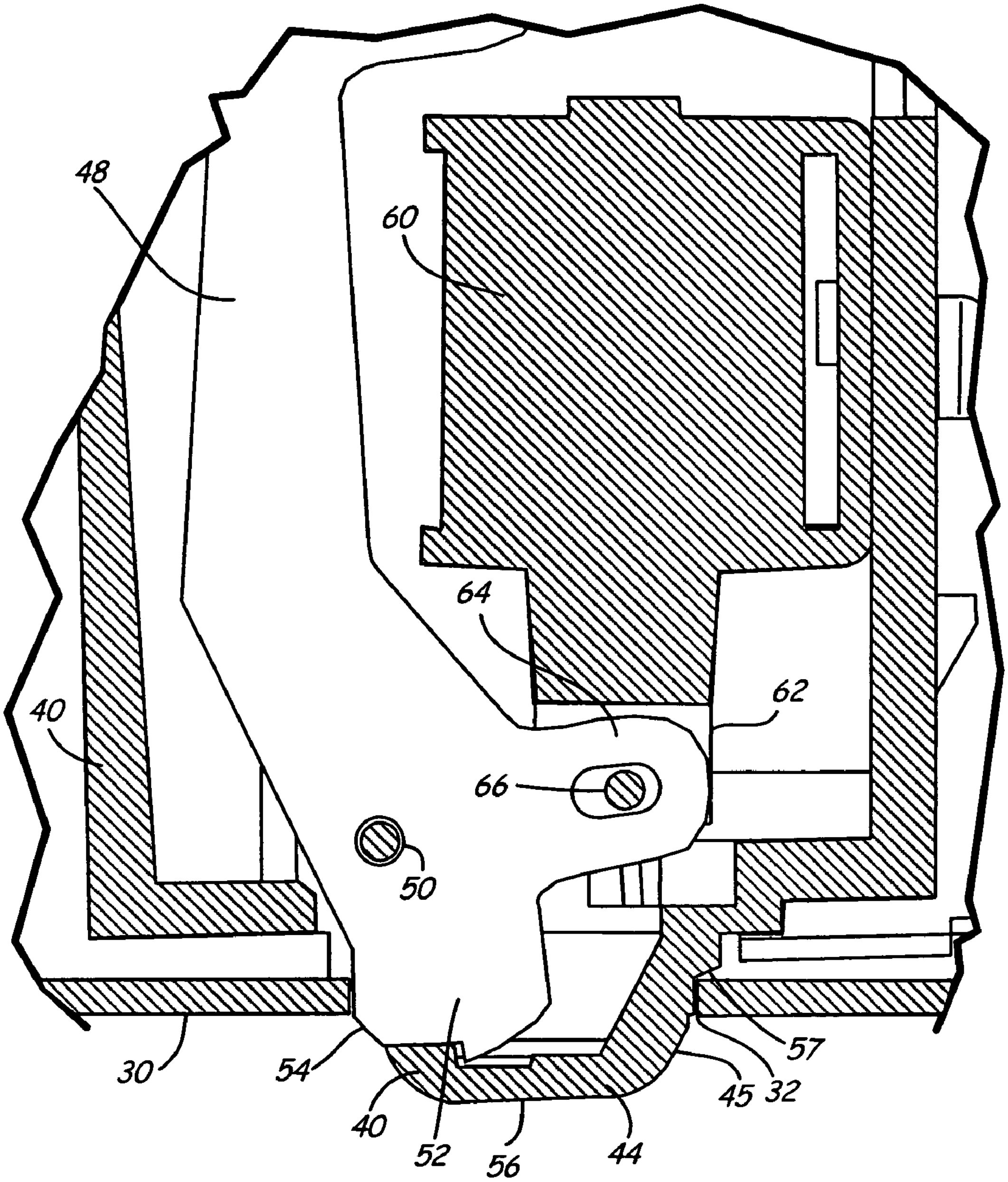
FIG. 6 is an enlarged fragmentary sectional view with the guide in the position of FIG. 4.
Figure 7:
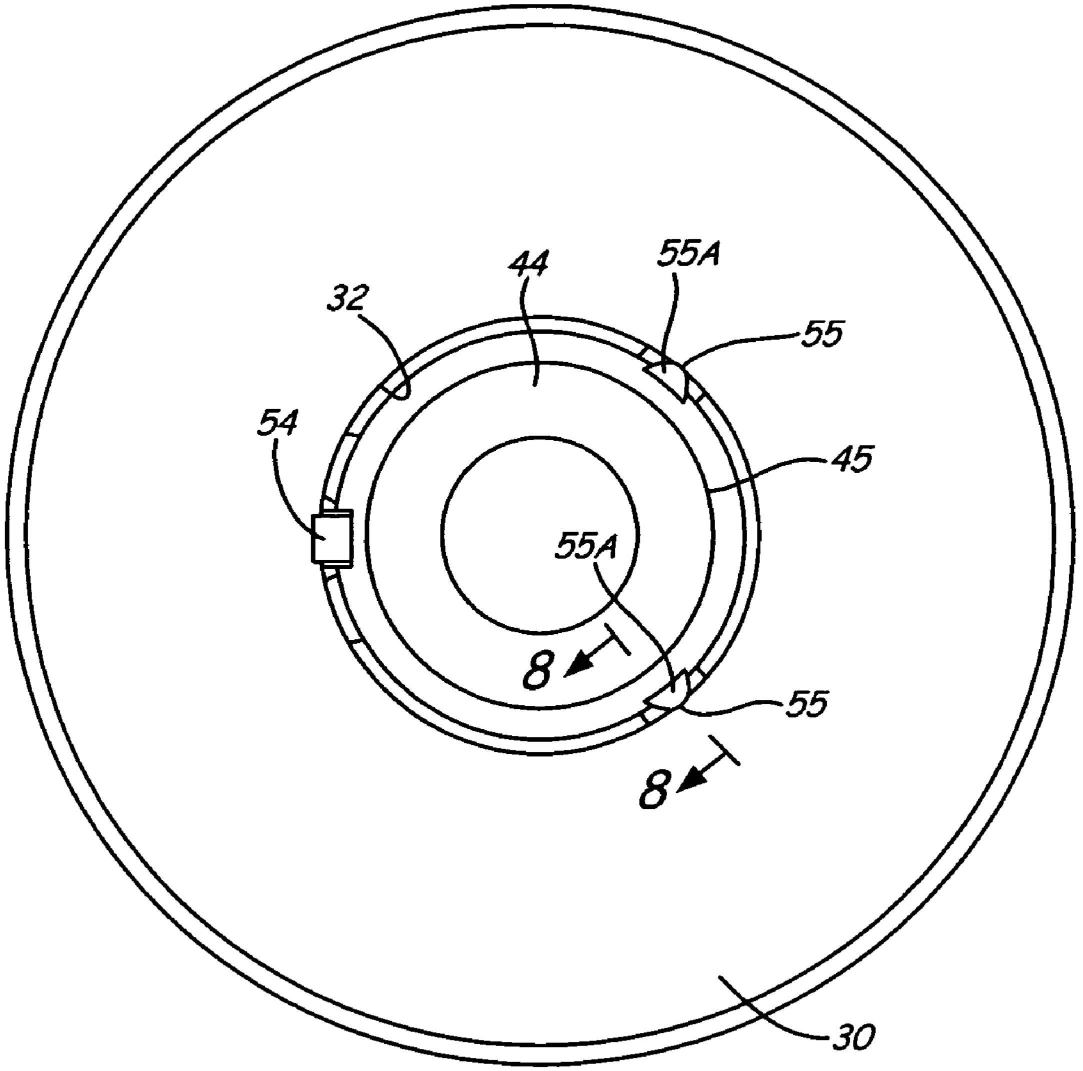
FIG. 7 is a fragmentary bottom plan view of FIG. 6.

FIGS. 3 and 5 illustrate a disc 30 and picker shortly before the disc is engaged by the picker finger 48. In FIGS. 3 and 5, the picker finger 48 is retracted, and it is held in this position by an actuator, as disclosed a solenoid 60, that has a movable plunger 62 coupled to an actuating arm 64 of the picker finger 48 with a drive pin 66.

The picker finger 48 is spring loaded in clockwise direction with a suitable spring 68 that is, as shown, attached to an upper arm portion 70 of the disc lifting picker finger 48.

The picker head 20 has a disc sensor 72 that is movably mounted on the picker head frame or housing 40. As can be seen in FIGS. 3 and 5, the sensor 72 has an end portion 74 that will engage the upper surface of a disc 30 to be picked up when the picker head moves toward the disc surface by up/down drive 24 using stepper motor 24A. The sensor end portion 74 will engage the upper surface of the disc 30 as the picker head 20 is moved downwardly along the drive 24 and as the guide 44 starts to enter the opening 32. The sensor 72 provides a signal that energizes the solenoid 60 through the controls 25 so the lug 54 is retracted inwardly to be within the periphery of the opening in the disc to be picked, and, as shown, within the guide 44. Solenoid 60 is energized until the lugs 55 and picker finger are moved downwardly a known distance by up/down drive 24 (such as by counting steps of stepper motor 24A) so it is known by the controls 25 when lug 54 is in the disc opening. In this energized position the solenoid 60 is retracted and pivots the finger 48 to its retracted position shown in FIG. 3 against the action of the spring 68.

The disc sensor 72 is a mechanical sensor, which is pivotally mounted in a suitable manner on the housing 40. The disc sensor 72 provides a signal to the controls 25 to energize the solenoid 60 before the lug 54 starts to enter the hole in a disc to be lifted. The signal from the sensor 72 continues to indicate when a disc is in position on the picker head, and when the picker head has been moved by controls 25 operating stepper motor 24A to the position where the lug 54 and 55 are in the disc hole, the solenoid 60 or other actuator is relaxed or de-energized so the spring 68 then will pivot the finger 48 in a clockwise direction.

Figure 8:
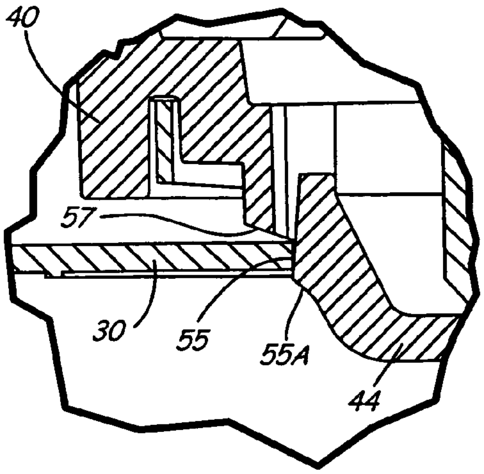
FIG. 8 is a sectional view taken on line 8-8 in FIG. 7.
Figure 9:
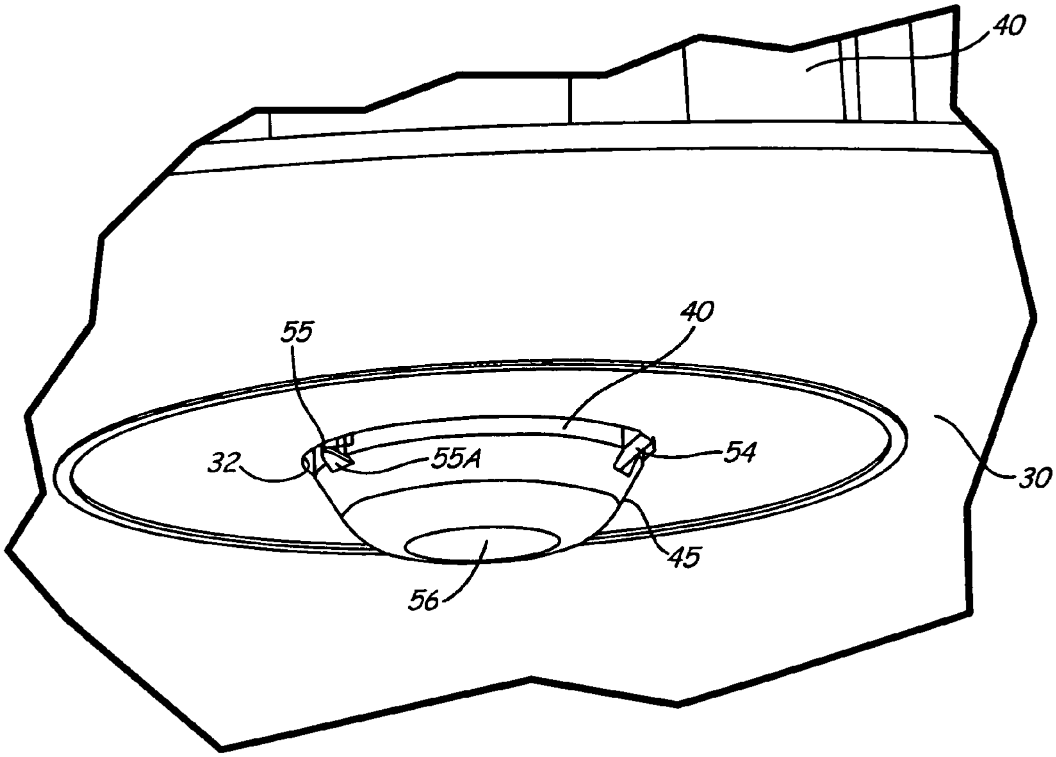
FIG. 9 is a bottom perspective view of a disc seated on the picker head and viewed in an opposite direction from FIG. 3.

As the spring 68 pivots the finger 48 in clockwise direction, the lug 54 on finger 48 will be pivoted outwardly about the pin 50 through the slot 57 in the guide 44 and will engage the surface of the disc opening 32, urging the disc 30 to move to engage the lugs 55 (or other reaction members). The outer sides of lugs 55 have a taper inwardly in upward direction as seen in FIG. 8. The inward taper helps to hold the disc. The stop surface or shoulder 57 can be formed when the part is molded, or in the other ways. The upper surface of the disc 30 engages stop surface 57 when the disc is seated properly.

When the solenoid is relaxed, the spring 68 provides sufficient force to cause the lug 54 to securely engage the edge or surface defining the opening 32, and urge the surface portions of the disc opening opposite from the finger against the lugs 55. The spring 68 provides a force to hold a disc 30 so that when the arm 22 is raised by the drive 24 using a screw or moving the arm up in other ways, the picker head 20 will lift a disc 30 from the stack that is shown in FIG. 1 and permit transporting the disc to another location as the arm 22 is moved.

When the picker head 20 is moved to a known position where the disc 30 is to be dropped, the controls 25 for the picker head will energize the solenoid 60 and the lug 54 on finger 48 is retracted, so the disc will drop. The sensor arm 74 also move to its position shown in FIG. 5 so it is in position to sense when the picker head 20 is approaching another disc to be picked.

The picker finger 48 is normally in position with the lug 54 extended, unless the actuator or solenoid 60 is powered and the picker finger and lug 54 are retracted from the lifting or working position by operation of the mechanical actuator, as shown the solenoid 60. The force with which the lug 54 engages the edge surface of the disc opening 32 and urges the other side of the disc opening to seat against reacting portions of the guide such as lugs 55 is a controlled force. The controlled force provides an expanding gripping action. The lifting action is repeatable without errors.

It is to be understood that many types of picker head housings and support arms for the housings can be used. The movement of the support arm between the desired locations can be accomplished in a wide variety of ways as well.

It should be noted that any desired type of spring load or biasing device can be utilized in place of the tension spring 68 shown. Torsion springs, compression springs and the like can be used for generating necessary forces to pivot the picker finger, and of course the spring load could be directly applied to the actuator that is utilized, for example spring loading the plunger on the solenoid in a desired direction will work. The solenoid would overcome the spring force when it was actuated to get the desired movement of the finger.

The guide 44 can take many shapes as well, but having a tapered surface, such as a conical taper aids in centering the disc for engagement by the lug portion of the picker finger when the picker finger is operated.

Although the present invention has been described with reference to preferred embodiments, workers skilled in the art will recognize that changes may be made in form and detail without departing from the spirit and scope of the invention.

What is claimed is:

1. An apparatus for picking up a disc having a central opening defined by an interior surface, the apparatus comprising a picker head, a guide on a lower portion of the picker head having a periphery of size to fit within the central opening of a disc, and a finger that is mounted on the guide and movable from a first position within the periphery of the guide to a second position with a portion of the finger extending outwardly from the periphery of the guide, a biasing load for loading the finger toward the second position, and an actuator to move the finger portion to its first position and releasable in response to a signal whereby the biasing load urges the finger toward the second position and against an interior surface of an opening in a disc in which the guide is placed to cause the interior surface to engage another portion of the guide for retaining the disc in position on the picker head.

2. The apparatus of claim 1, wherein said biasing load comprises a spring load.

3. The apparatus of claim 1, wherein said finger is pivotally mounted on said picker head, and wherein the finger has a lug that protrudes out beyond the periphery of the guide when the finger is moved to out the second position.

4. The apparatus of claim 3, wherein said biasing load urges the finger to pivot to extend a portion of the finger outwardly beyond the guide.

5. The apparatus of claim 1, wherein a peripheral outer surface of said guide is at least partly conical for guiding entry into the disc opening.

6. The apparatus of claim 1, wherein said actuator comprises a solenoid, said solenoid overcoming the biasing load to retract the finger portion to the first position.

7. The apparatus of claim 1, wherein said finger is pivotally mounted on said picker head, and the actuator comprises a solenoid having a link to the finger to pivot the finger to the first position when the solenoid is actuated.

8. The apparatus of claim 1, wherein said guide is on a lower surface of the picker head, and at least a portion of an outer surface of the guide is conical to expand in a direction away from a disc to be picked up, the guide having an annular surface above the conical surface that will engage the interior surface of the opening in the disc in which the guide is placed.

9. The apparatus of claim 8 further comprising a stop surface on the guide joining the annular surface to engage a surface of the disc when the annular surface is within the opening in the disc.

10. The apparatus of claim 1 further comprising a sensor on the picker head to provide a signal when the guide is within the opening.

11. A disc picker for picking a single compact-disc having a center hole for transport, the disc picker comprising a movable picker head, a center guide of size to enter a hole in a disc to be picked, said center guide having a guide surface tapering outwardly in direction away from a disc to be picked, and a picker member pivotally mounted on the guide and pivotally movable relative to the guide between a retracted position to permit the guide to fit within a periphery of the hole in a disc in which the guide is placed and an extended position wherein the picker member will engage an edge surface defining a periphery of the hole in such a disc, the picker member being controllably pivotally movable to its extended position outwardly to engage the edge surface defining the periphery of the hole at selected times and movable to retract the picker member to its retracted position.

12. The disc picker of claim 11 wherein said guide surface comprises a generally conical portion and surface portions of size to fit within the hole in a disc at an upper end of the conical surface portion, said picker member comprising a pivotally mounted finger having a portion movable outwardly from the center guide to its extended position.

13. The disc picker of claim 12 and a stop surface on the center guide for engaging a side of the periphery of the center hold of a disc into which the center guide is placed when the center guide is seated within the hole in such disc.

14. The disc picker of claim 11 wherein said picker member is normally biased with a force to extend outwardly from the center guide to its extended position, and a controllable actuator operable to retract the picker member to its retracted position.

15. The picker head of claim 14 wherein said picker member comprises a finger mounted on the picker head, and wherein the biasing force is provided by a spring load between the picker head and the finger.

16. The picker head of claim 15 further comprising the controllable actuator being coupled to the finger to retract the finger inwardly from a periphery of the center guide against the force biasing the finger outwardly.

17. A picker apparatus for engaging an internal edge surface defining an opening in a media disc, comprising a picker head, a guide on a lower portion of the picker head having a guide portion of a fixed periphery of size to fit within the opening of a media disc, and a finger movably mounted on the head and movable relative to other portions of the guide from a first position within the periphery of the guide portion to a second position with the finger extending outwardly from the periphery of the guide portion, a spring for loading the finger toward the second position, and an actuator to move the finger to out the first position and releasable in response to a signal, whereby the spring urges the finger toward the second position to engage the interior edge surface defining the opening in a media disc in which the guide is placed to cause the interior edge surface to engage the guide at a position spaced from the finger for retaining the media disc in position on the picker head.

* * * * *